United States Patent [19]
Ishii et al.

[11] Patent Number: 5,124,875
[45] Date of Patent: Jun. 23, 1992

[54] OVERCURRENT PROTECTION APPARATUS

[75] Inventors: Kazuhiro Ishii; Kouji Hirotsune, both of Fukuyama, Japan

[73] Assignee: Mitsubishi Denki Kabushiki Kaisha, Tokyo, Japan

[21] Appl. No.: 568,863

[22] Filed: Aug. 17, 1990

[30] Foreign Application Priority Data

Oct. 4, 1989 [JP] Japan .................. 1-257876

[51] Int. Cl.$^5$ ............................ H02H 3/26
[52] U.S. Cl. ............................ 361/93; 361/42; 361/45; 361/94
[58] Field of Search ........ 361/56, 91, 93-98, 361/42-50

[56] References Cited

U.S. PATENT DOCUMENTS

3,818,275  6/1974  Shimp ................. 361/91
4,331,999  5/1982  Engel et al. .......... 361/94
4,603,336  7/1986  Müller ................ 361/98

Primary Examiner—Howard L. Williams
Assistant Examiner—S. Jackson
Attorney, Agent, or Firm—Burns, Doane, Swecker & Mathis

[57] ABSTRACT

A current of an alternating current electric line is detected by a current transformer, the output of the current transformer is rectified by a rectifier, a series connection of a switching means and a resistor is coupled across the output terminals of the rectifier, a control circuit composed of a capacitor, a comparator and a reference voltage generator is coupled in parallel to the switching means through a diode, when the DC output voltage exceeds a predetermined voltage based on the reference voltage of the reference voltage generator, the comparator outputs a signal for closing the switching means, and the voltage which is applied to the control circuit is limited to a predetermined value.

3 Claims, 7 Drawing Sheets

OVERCURRENT PROTECTION APPARATUS

FIELD OF THE INVENTION AND RELATED ART STATEMENT

1. FIELD OF THE INVENTION

The present invention relates generally to an overcurrent protection apparatus, and more particularly to an overcurrent protection apparatus which is combined with a circuit breaker.

2. DESCRIPTION OF THE RELATED ART

Figure 7:
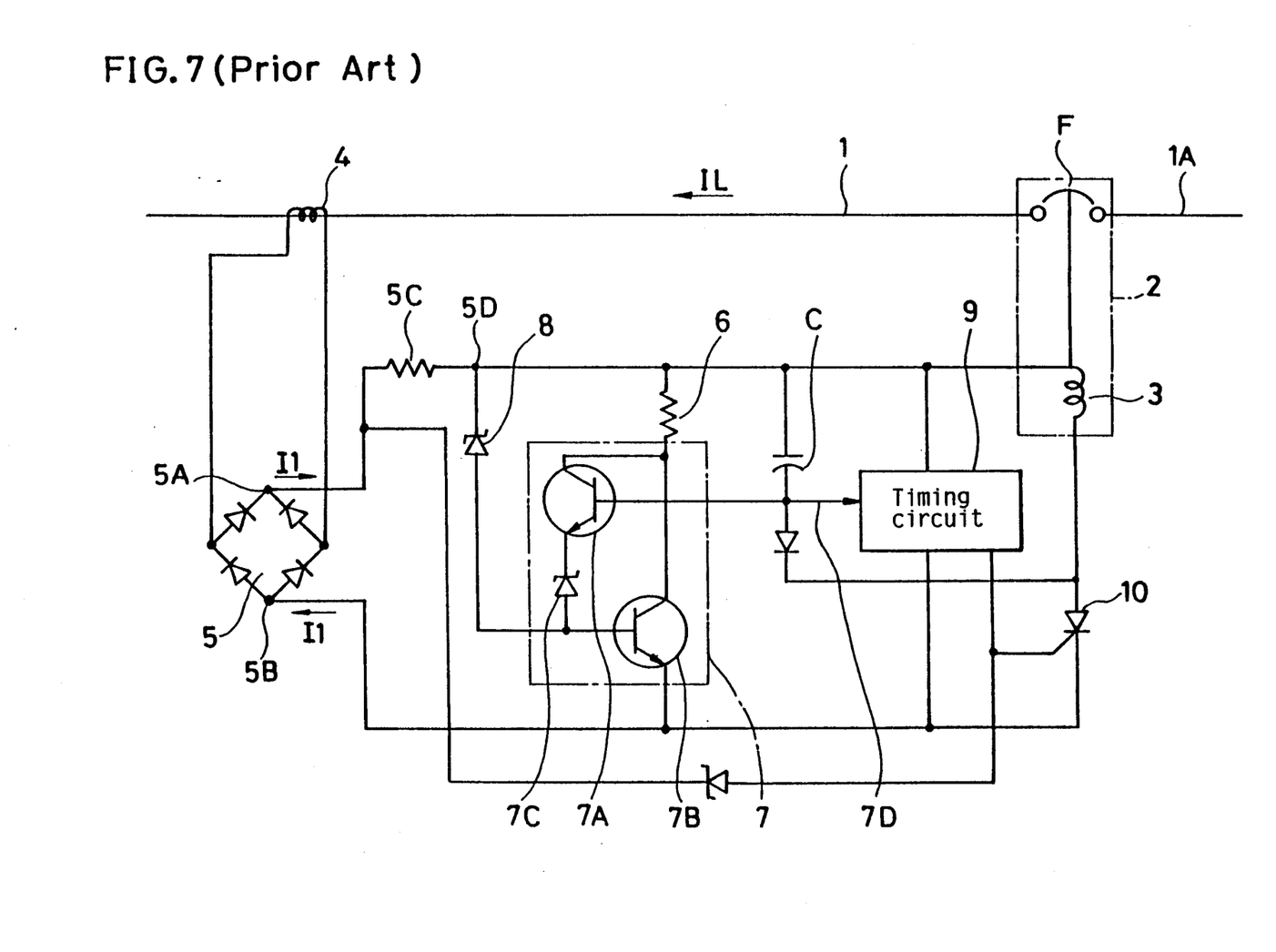
FIG. 7 is the circuitry of the overcurrent protection apparatus in the prior art.

FIG. 7 illustrates a circuit diagram of an overcurrent protection apparatus in the prior art shown in the U.S. Pat. No. 3,818,275. Referring to FIG. 7, an electric line 1 is connected to a power source line 1A of an alternating current through a switch F of a circuit breaker 2. The current IL of the electric line 1 is detected by a current transformer 4 (hereinafter abbreviated as CT). The output of the CT4 is rectified by a full wave bridge rectifier circuit 5, and a DC voltage is output from terminals 5A and 5B.

A series connection of a resistor 6 and a control circuit 7 is coupled across the terminals 5A and 5B through a resistor 5C.

The control circuit 7 is composed of two transistors 7A and 7b which have their collectors cupled to the resistor 6 and a Zener diode. The emitter of the transistor 7A is coupled to the base of the transistor 7B through a Zener diode 7C which is connected to the emitter of the transistor 7A at the cathode. The emitter of the transistor 7B is coupled to the terminal 5B. Another zener diode 8 is coupled between the junction 5D between the resistors 5C and 6 and the base of the transistor 7B in a manner that the cathode of the zener diode 8 is connected to the junction 5D. The base of the transistor 7A is connected to an input of a timing circuit 9. The zener diode 8 serves to limit the voltage of the junction 5D to a predetermined voltage which is determined by the zener voltage of the zener diode 8.

The timing circuit 9 is coupled across the junction 5D and the terminal 5B, from which the electric power is supplied to the timing circuit 9. A series connection of a trip magnet 3 and a thyristor 10 is coupled across the junction 5D and the terminal 5B in a manner that the cathode of the thyristor 10 is connected to the terminal 5B. The gate of the thyristor 10 is connected to the output of the timing circuit 9.

A capacitor C is coupled between the junction 5D and the input 7D of the timing circuit 9.

In operation, the current IL flowing in the electric line 1 is detected by the CT4. An output of the CT4 is rectified by the full wave bridge rectifier 5, and a DC voltage is output at both of the terminals 5A and 5B.

When the current IL is lower than a predetermined rated current, the DC voltage across the junction 5D and the terminal 5B is lower than the zener voltage of the zener diode 8, so that no current flows through the zener diode 8.

A current flows through the resistor 6 and the control circuit 7. The voltage across the input 7D and the terminal 5B is held at a constant value which is determined by the zener voltage of the zener diode 7C. On the other hand, the voltage across the junction 5D and the input 7D varies in response to the current IL in the electric line 1, since the current which flows through the resistor 6 and the control circuit 7 varies. Consequently, electric power consumption in the resistor 6 and the control circuit 7 varies, wherein most of the electric power in the control circuit 7 is consumed in the zener diode 7C.

When the current IL increases and exceeds the rated current, the voltage across the junction 5D and the input 7D exceeds a predetermined threshold voltage of the timing circuit 9, which activates the timing circuit 9. After a predetermined time period which is set in the timing circuit 9, the output is applied to the gate of the thyristor 10, and the thyristor 10 turns ON. Hence, the trip coil 3 of the circuit breaker 2 is excited and the switch F is opened.

In the control circuit 7 of the circuit interrupter in the prior art, a current detected by the current transformer flows into the resistor 6 and the control circuit 7, and the electric power is consumed in the resistor 6 and the thyristor 7C in order to maintain a constant voltage at the input 7D of the timing circuit 9. Consequently, the resistor 6 and thyristor 7C are heated. Thus, heat radiator means must be provided on the control circuit 7, which prevents the circuit interrupter from being able to be miniaturized.

OBJECT AND SUMMARY OF THE INVENTION

An object of the present invention is to provide an overcurrent protection apparatus which is improved in electric power consumption.

The overcurrent protection apparatus in accordance with the present invention comprises:

a current transformer for detecting a current of an alternating current electric line, a rectifier for rectifying the output current of the current transformer, a series connection of a switching means and a resistor coupled across the positive output and the negative output of the rectifier, a capacitor coupled across the switch means through a diode which is for interrupting a D.C. current flow form the capacitor to the rectifier, a reference voltage generator for generating a predetermined reference voltage, duty ratio varying means for generating a control signal for varying a duty ratio of operation of the switching means in proportion to the output voltage of the rectifier in an output voltage range which exceeds the reference voltage, circuit breaker means for disconnecting the alternating current electric line from an electric power source line when a voltage across the resistor exceeds a predetermined value.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
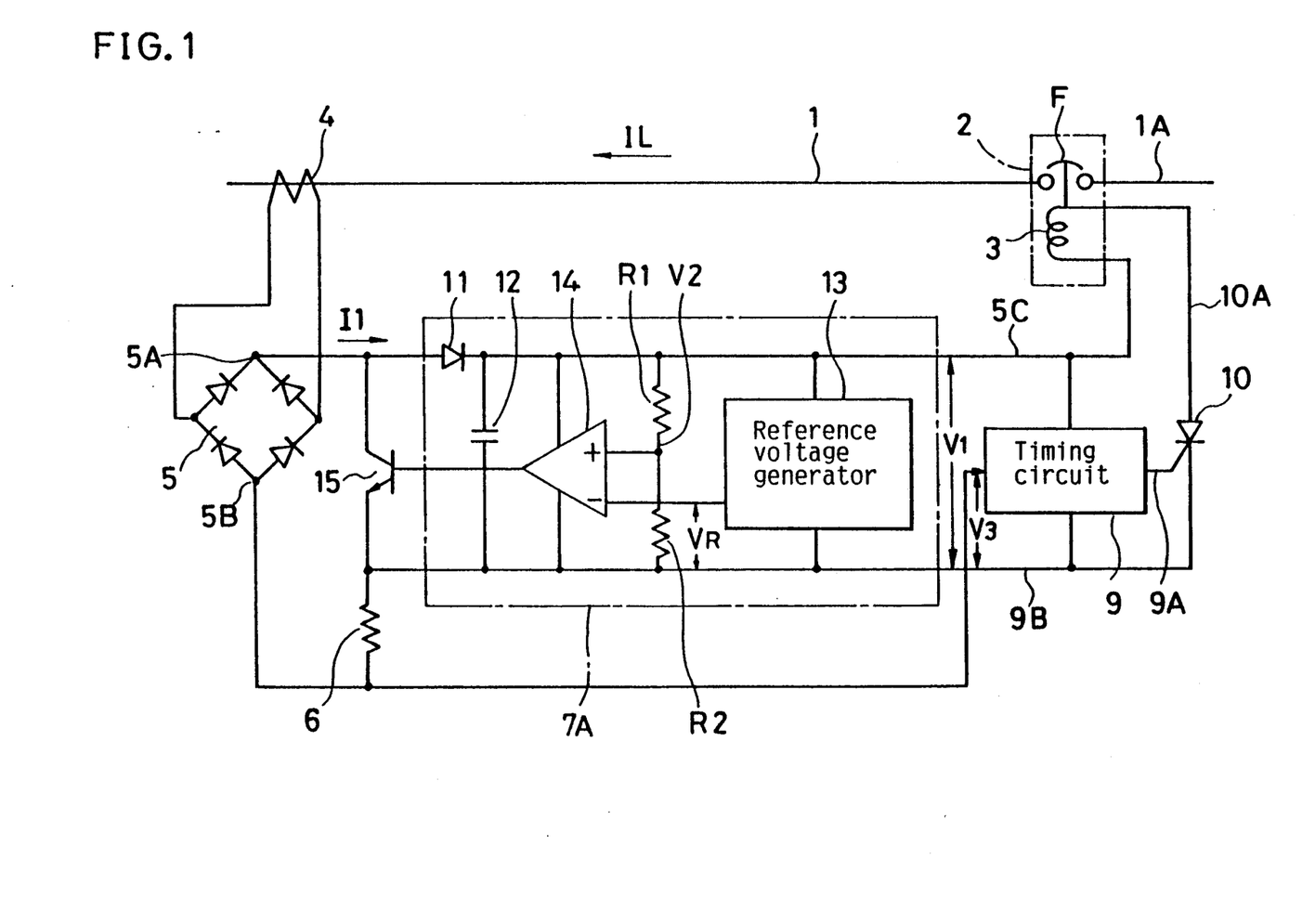
FIG. 1 is a circuitry of a first protection apparatus in accordance with the present invention that includes a comparator.

FIG. 1 is a circuit diagram of a first embodiment of the overcurrent protecting apparatus in accordance with the present invention. Referring to FIG. 1, an electric line 1 is connected to a power source line 1A of an alternating current through a switch F of a circuit breaker 2. A current IL in the electric line 1 is detected by a current transformer 4. The output of the current transformer 4 is rectified by a full wave bridge rectifier 5.

A series connection of a transistor 15 and a resistor 6 is coupled across a positive terminal 5A and a negative terminal 5B of the rectifier 5. A control circuit 7A is coupled in parallel to the transistor 15. A timing circuit 9 is coupled across a positive power source line 5C and a negative power source line 9B of the control circuit. The timing circuit 9 is activated when the absolute value of a negative input voltage V3 across the negative power source line 9B and the negative terminal 5B exceeds a predetermined voltage VT. The delay time of the timing circuit 9 varies in compliance with the negative input voltage V3. The timing circuit 9 is provided with a filter circuit therein, which filters the pulsating input voltage V3.

The output 9A of the timing circuit 9 is connected to the gate of a switch means or a thyristor 10. The thyristor 10 turns ON when the timing circuit 9 finishes a time counting operation. A trip coil 3 of the circuit breaker 2 is connected between the positive power source line 5C and the anode of the thyristor 10, and is excited by conductive state of the thyristor 10. The switch F is disconnected by the excitation of the trip coil 3. A diode 11 interrupts a current flow from the positive power source line 5C to the positive terminal 5A. A capacitor 12 serves as a filter.

A reference voltage generator 13 generates a predetermined reference voltage. The reference voltage is applied to the invert input (−) of a comparator 14. The voltage V1 at the line 5C is divided into a suitable voltage V2 by a dividing network of resistors R1 and R2. The voltage V2 is applied to the noninvert input (+) of the comparator 14. The output of the comparator 14 is applied to the base of the transistor 15.

The operation of the embodiment is elucidated hereafter. FIGS. 2(a), 2(b), 2(c) and 2(d) are waveforms in operation of the first embodiment. A current IL in the electric line 1 is detected by the current transformer 4, and the output of the current transformer 4 is rectified by the rectifier 5.

Figure 2A:
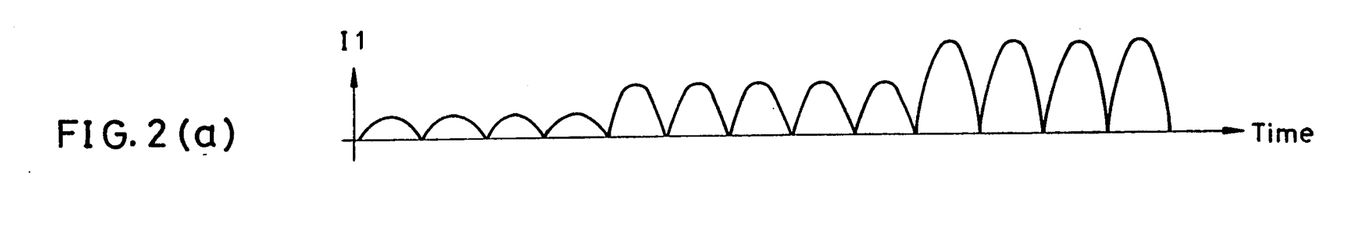
FIGS. 2(a), 2(b), 2(c) and 2(d) are waveforms in operation of the first protection apparatus.
Figure 2B:
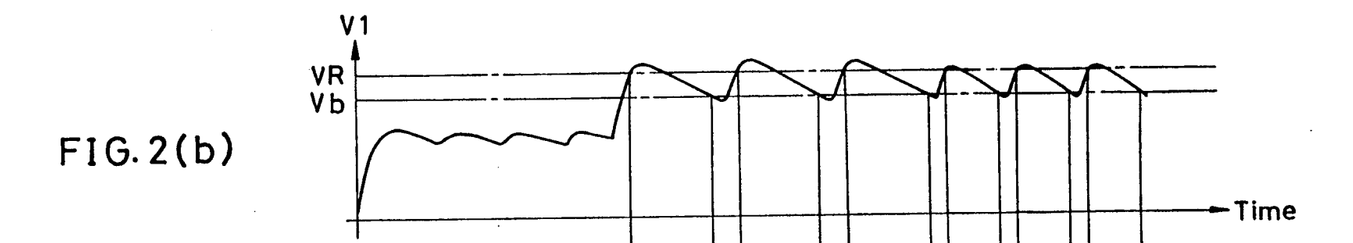

The waveform of the output current I1 from the positive terminal 5A and to the negative terminal 5B of the rectifier 5 is shown in FIG. 2(a). The output current I1 flows into the line 5C through the diode 11. The waveform of the voltage V2 is shown in FIG. 2(b). Referring to FIG. 2(b), the reference voltage VR of the reference voltage generator 13 is shown by an alternate long and short dash line. A voltage Vb which is lower than the voltage VR is also shown by alternate long and two short dashes line. When a voltage V2 which is applied to the comparator 14 at the noninvert input (+) exceeds the reference voltage VR, the output of the comparator 14 appears. Since the comparator 14 generally has hysteresis, when the voltage which is applied to the noninvert input (+) is decreased to less than the voltage Vb, the output of the comparator 14 disappears.

When the current IL is far lower than a predetermined rated current, the voltage V2 is lower than the reference voltage VR.

Figure 2C:
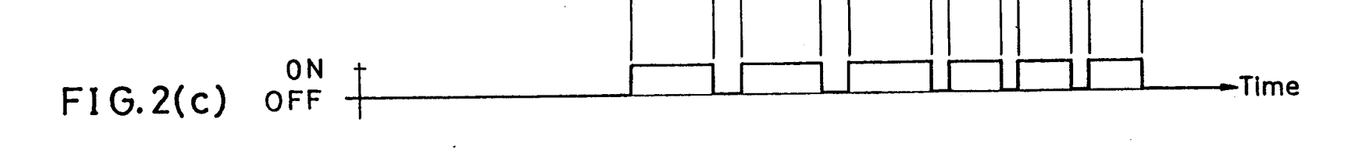

When the current IL increases in the neighborhood of the rated current and the voltage V2 exceeds the reference voltage VR, the comparator 14 supplies an output to the base of the transistor 15. Consequently, the transistor 15 turns ON as shown in FIG. 2(c), and the positive terminal 5A is short-circuited with the line 9B. The electric charge in the capacitor 12 is the discharged by current consumption in the comparator 14, reference voltage generator 13, timing circuit 9 and resistors R1 and R2, and the voltage V2 gradually falls. When the voltage V2 reaches the voltage Vb, the output of the comparator disappears, and the transistor 15 turns OFF. Therefore, the current in the transistor 15 and the resistor 6 disappears, and the voltage at the point 5A rises. The above-mentioned operation is repeated, and the voltage V2 is limited to a voltage which is not so higher than the reference voltage VR. Consequently, a duty ratio in operation of the transistor 15 is varied in compliance with the voltage across the terminals 5A and 5B.

Figure 2D:
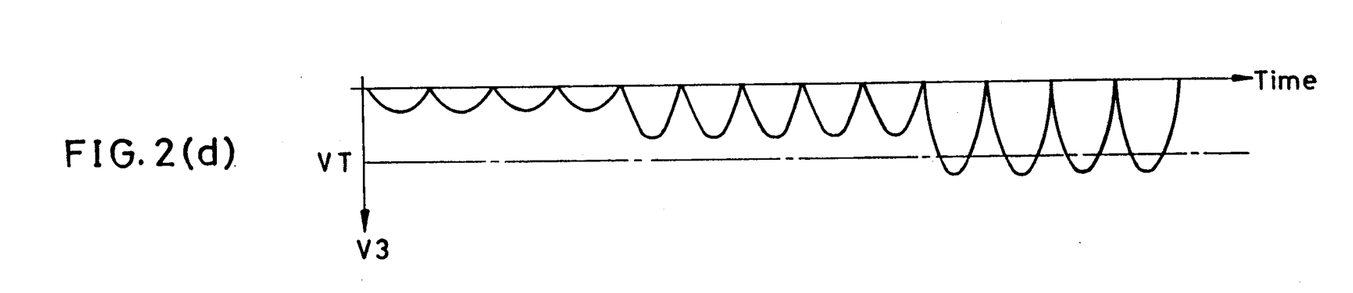

Further increase of the current IL over the rated current, results in an increase of the current flowing in the resistor 6. Consequently, the absolute value of the negative voltage V3 increases as shown in FIG. 2(d). When the voltage V3 exceeds the operation voltage VT of the timing circuit 9, the time counting operation of the timing circuit 9 is started. After a predetermined time period which is set in the timing circuit 9, the output thereof is applied to the gate of the thyristor 10. Thus, the thyristor 10 turns ON and the trip coil 3 is excited. Hence, the switch F is opened, and the electric line 1 is interrupted from the power source line 1A.

According to the first embodiment, an increase of the voltage V1 is limited by short-circuiting the terminal 5A and the line 9B from which an electric power is supplied to the control circuit 7A. The electric power consumption in the control circuit 7 is comparatively low because the reference voltage generator 13 and the comparator are composed of electronic circuits which consume little electric power. Therefore, the current flowing in the resistor 6 is comparatively lower, and the electric power consumption in the resistor 6 is comparatively lower in short-circuit state of the terminal 5A and the line 9B by the conductive state of the transistor 15. Hence, a small size resistor can be used.

Figure 3:
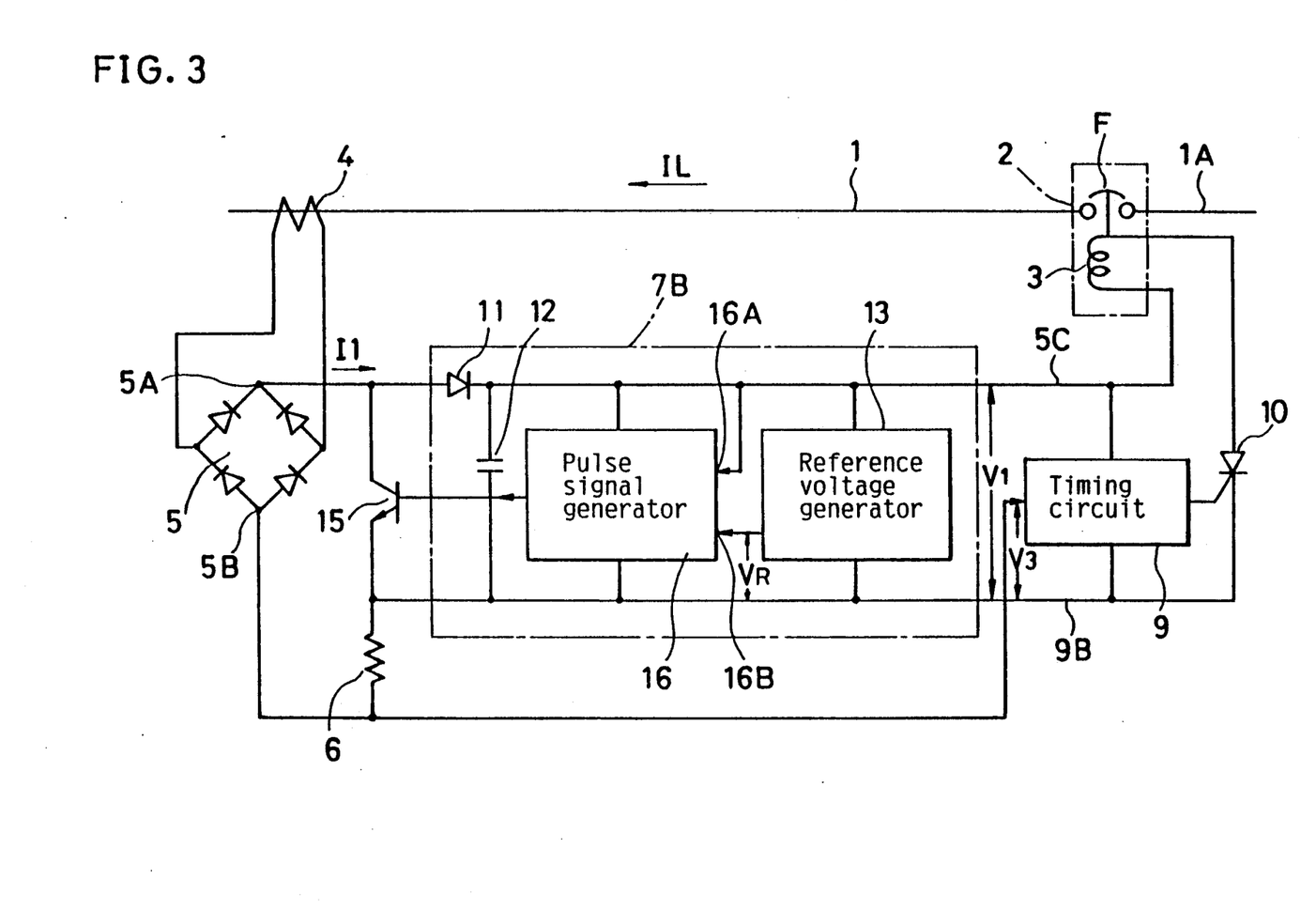
FIG. 3 is a circuitry of a second protection apparatus in accordance with the present invention that includes a pulse signal generator.

FIG. 3 illustrates a circuit diagram of a second embodiment of the overcurrent protection circuit in accordance with the present invention. In the second embodiment, the comparator 14 in the first embodiment is replaced with a pulse signal generator 16. The remaining components function in the same manner as described in the first embodiment and are designated by like numerals as used with corresponding parts shown in FIG. 1, and therefore will not be described. The pulse signal generator 16 generates a square wave signal of which a duty ratio is varied in compliance with an input voltage which is applied to a terminal 16A thereof. The reference voltage VR is applied to the other input terminal 16B.

Figures 4A, 4B:
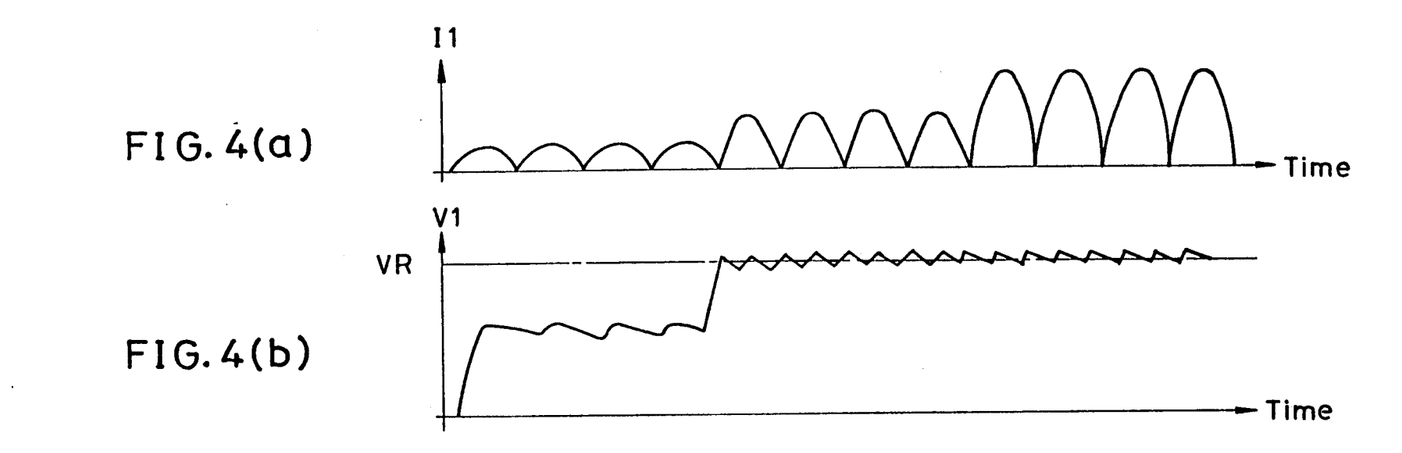
FIGS. 4(a), 4(b) and 4(c) are waveforms in operation of the second protection apparatus.
Figure 4C:
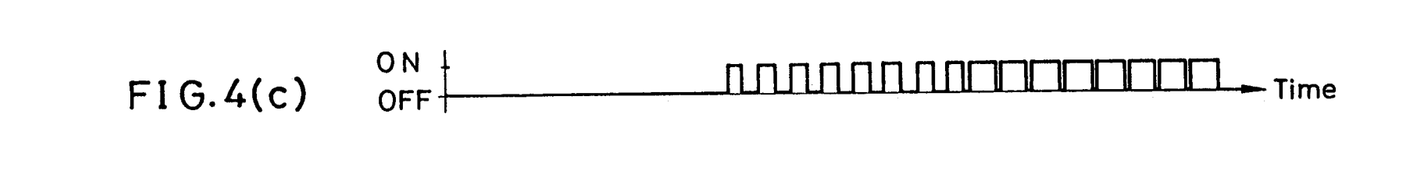
Figure 4D:
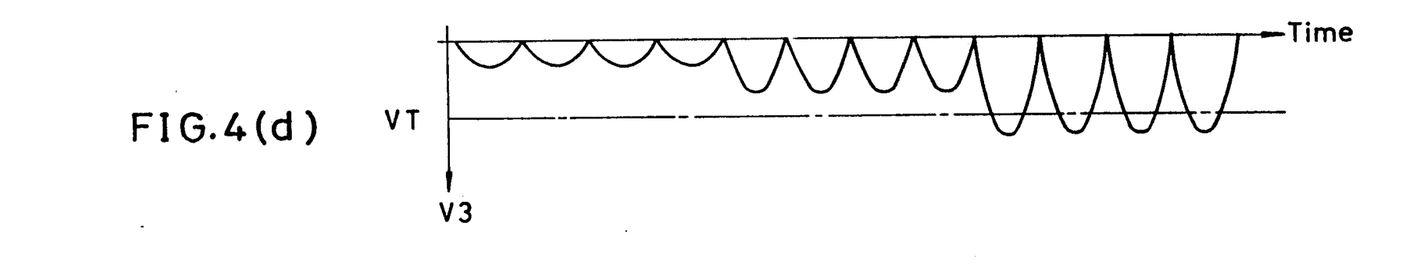

Operation of the second embodiment is elucidated with reference to FIGS. 4(a), 4(b), 4(c) and 4(d). FIG. 4(a) is a waveform of an output of the rectifier 5. FIG. 4(b) is a waveform of a voltage V1 across the lines 5C and 9B, and FIG. 4(c) is a diagram for representing switching operation of the transistor 15. The diagram of shown in FIG. 4(c) is substantially identical to the waveform of the output of the pulse signal generator 16, but the cycle period of the switching operation is shorter than that of the first embodiment, and the duty ratio of the output of the pulse signal generator 16 is increased in proportion to the increase of the output voltage of the rectifier 5. By means of the switching operation, even if the output of the rectifier 5 increases, the voltage V1 is held to a voltage which is close to the reference voltage VR as shown in FIG. 2(b). The operation of the timing circuit 9, the thyristor 10 and the circuit breaker 2 is identical with that of the first embodiment.

According to the above-mentioned second embodiment, since the cycle period of the switching operation is shorter than that of the first embodiment, the capacitance of the filter capacitor 12 can be reduced.

Figure 5:
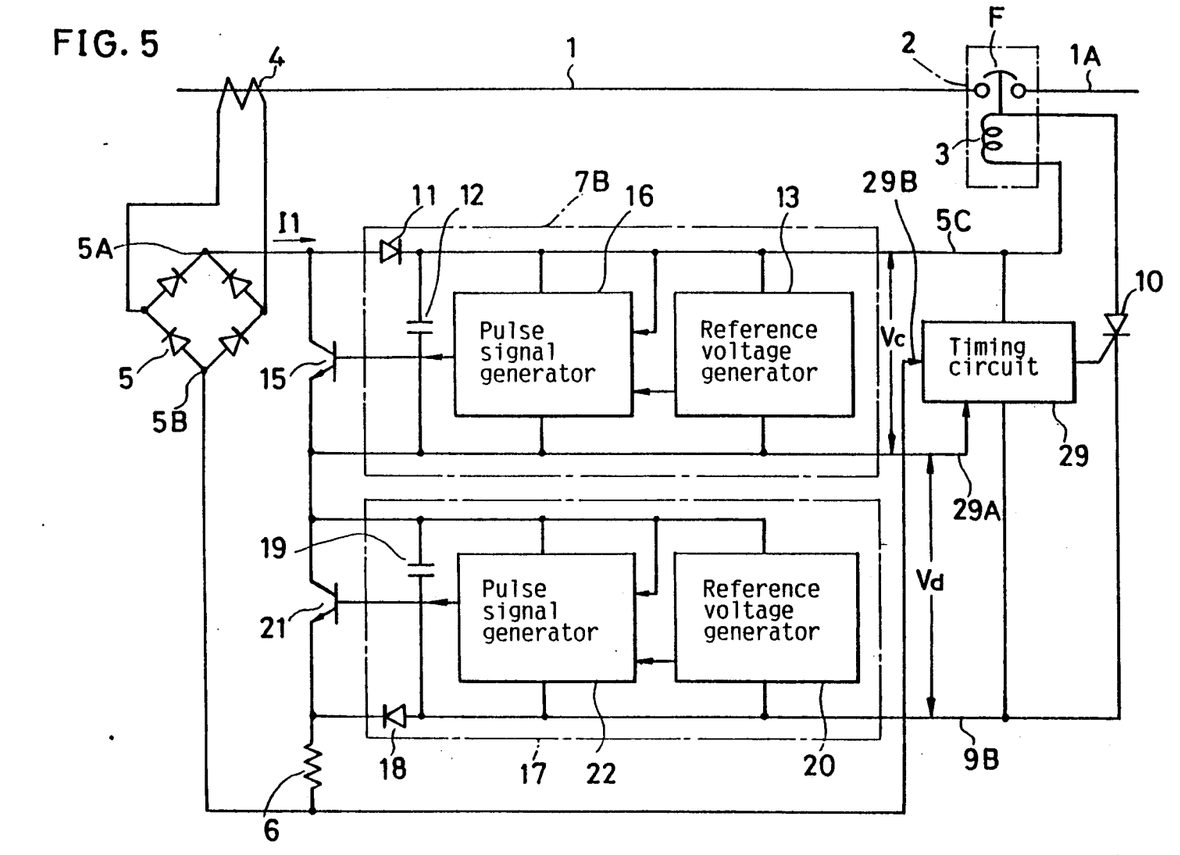
FIG. 5 is a circuitry of a third protection apparatus in accordance with the present invention that includes first and second pulse signal generators connected to plural reference voltage generators.

FIG. 5 illustrates a circuits diagram of a third embodiment of the overcurrent protection apparatus in accordance with the present invention. In the third embodiment, a timing circuit 29 is provided with two input terminals 29A and 29B for receiving differential inputs. A positive input Vc is applied across a positive power input terminal connected to the line 5C and the input terminal 29A, and a negative input Vd is applied across a negative power input terminal connected to the line 9B and the input terminal 29A. The input terminal 29B is connected to the negative terminal 5B of the rectifier 5. Two control circuits 7B and 17 are provided for supplying the positive inputs Vc and negative input Vd, respectively. Transistors 15 and 21 are coupled to the control circuits 7B and 17, respectively.

According to the third embodiment, since the timing circuit 29 is activated by the differential input, the accuracy in the detection of an overcurrent is improved.

Figure 6:
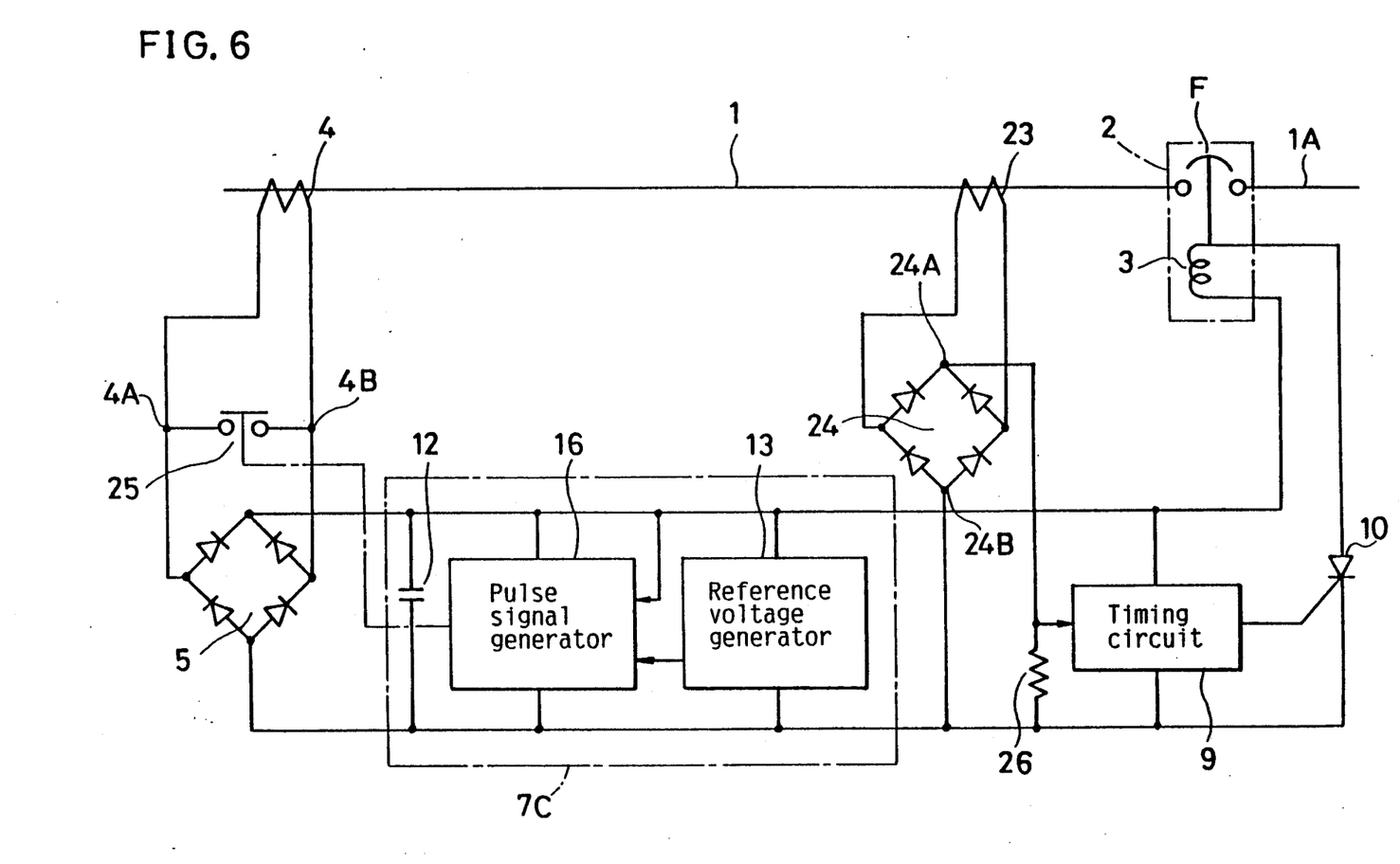
FIG. 6 is a circuitry of a fourth protection apparatus in accordance with the present invention that includes a pulse signal generator and plural current transformers connected to rectifiers.

FIG. 6 illustrates a circuit diagram of a fourth embodiment in accordance with the present invention. In this embodiment, two current transformers 4 and 23 are coupled to the electric line 1. The output terminals 4A and 4B of the current transformer 4 are short-circuited by a switch 25. The output of the current transform 4 is rectified by the full wave bridge rectifier 5 and is applied to a control circuit 7C. The control circuit 7C is identical with the control circuit 7B shown in FIG. 3 with the exception of the diode 11. The switch 25 is controlled by the output of the pulse signal generator 16.

The output of the other current transformer 23 is also rectified by the other full wave bridge rectifier 24. A resistor 26 is coupled across the DC output terminals 24A and 24B, and the DC output voltage is applied to the input of the timing circuit 9. The control circuit 7C serves to supply the electric power to the timing circuit 9.

In the operation of the forth embodiment, the switch 25 is connected or disconnected by the output of the pulse signal generator 16, and the DC voltage across the terminals 5A and 5B is held to a predetermined constant value.

The DC voltage across the terminals 24A and 24B of the rectifier 24 varies in proportion to the variation of the current IL of the electric line 1. When the DC voltage exceeds a predetermined voltage which is set in the timing circuit 9, the timing circuit 9 is activated, and the operation of the switch 10 and the circuit breaker 2 follows in a manner similar to that described in the first embodiment.

According to the forth embodiment, the output of the current transformer 23 is used to activate only the timing circuit 9. Therefore, power consumption can be disregarded. Consequently, linearity in current detection of the current transformer 25 is improved, and accuracy in overcurrent detection is also improved.

In the above-mentioned embodiments, though only one of a plurality of electric lines (for example, three electric lines of three phase electric lines) is drawn in the respective figures, the current protection apparatus in accordance with the present invention can be applicable to a plurality of electric lines.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An overcurrent protection apparatus comprising
a current transformer for detecting a current of an alternating current electric line,
a rectifier for rectifying the output current of said current transformer,
a series connection of a switching means and a resistor coupled across the positive output and the negative output of said rectifier,
a capacitor coupled across said switch means through a diode which is for interrupting a D.C. current flow from said capacitor to said rectifier,
a reference voltage generator for generating a predetermined reference voltage,
duty ratio varying means for generating a pulse signal for varying a duty ratio of operation of said switching means in proportion to the output voltage of said rectifier in an output voltage range which exceeds said reference voltage and,
circuit breaker means for disconnecting said alternating current electric line from an electric power source line when a voltage across said resistor exceeds a predetermined value.

2. An overcurrent protection apparatus comprising
a current transformer for detecting a current of an alternating current electric line,
a rectifier for rectifying the output of said current transformer,
a series connection of a first switching means, a second switching means and a resistor coupled across the positive output and the negative output of said rectifier,
a first capacitor coupled across said first switch means through a first diode for interrupting a current flow from said first capacitor to said rectifier,
a second capacitor coupled across said second switch means through a second diode for interrupting a current flow from said second capacitor to said rectifier, a first reference voltage generators for generating a predetermined first reference voltage, first duty ratio varying means for generating a control signal for varying a duty ratio of operation of said first switching means in proportion to the output voltage of said rectifier in an output voltage range which exceeds said first reference voltage, a second reference voltage generators for generating a predetermined second reference voltage, second duty ratio varying means for generating a control signal for varying a duty ratio of operation of said second switching means in proportion to the output voltage of said rectifier in an output voltage range which exceeds said second reference voltage, circuit breaker means for disconnecting said alternating current electric line from an electric power source line when a voltage across said resistor exceeds a predetermined value.

3. An overcurrent protection apparatus comprising a first and second current transformers for detecting a current of an alternating current electric line, a switching means coupled across the output terminals of said first current transformer, a first rectifier for rectifying the output of said first current transformer, a capacitor coupled across the positive output and the negative output of said first rectifier, a reference voltage generator for generating a predetermined reference voltage, a duty ratio varying means for generating a control signal for varying a duty ratio of operation of said switching means in proportion to the output voltage of said first rectifier in an output voltage range which exceeds said reference voltage, a second rectifier for rectifying the output of said second current transformer, a resistor coupled across the positive output and the negative output of said second rectifier, circuit breaker means for disconnecting said alternating current electric line from an electric power source line when a voltage across said resistor exceeds a predetermined value.

* * * * *